United States Patent [19]
Prosdocimi et al.

[11] Patent Number: 5,857,345
[45] Date of Patent: Jan. 12, 1999

[54] METHOD OF MANAGING A SOLID/GAS ADSORPTION OR THERMOCHEMICAL REACTION

[75] Inventors: Jacques Prosdocimi, Canohes; Bernard Spinner, Corneilla del Vercol; Vincent Goetz, Perpignan, all of France

[73] Assignee: Elf Aquitaine, France

[21] Appl. No.: 864,463

[22] Filed: May 29, 1997

[30] Foreign Application Priority Data

May 30, 1996 [FR] France .................................. 96 06682

[51] Int. Cl.⁶ ...................................................... F25B 17/00
[52] U.S. Cl. ................................................ 62/106; 62/480
[58] Field of Search ............................ 62/101, 106, 476, 62/480, 481

[56] References Cited

U.S. PATENT DOCUMENTS

| | | | |
|---|---|---|---|
| 2,162,256 | 6/1939 | Herrmann et al. | 62/5 |
| 2,208,716 | 7/1940 | Amundsen | 62/5 |
| 4,759,191 | 7/1988 | Thomas et al. | 62/101 |
| 4,901,535 | 2/1990 | Sabin et al. | 62/101 |
| 4,949,549 | 8/1990 | Steidl et al. | 62/101 |
| 4,993,239 | 2/1991 | Steidl et al. | 62/480 |
| 5,056,591 | 10/1991 | Spinner et al. | 165/104 |
| 5,442,931 | 8/1995 | Ryan et al. | 62/101 |
| 5,518,069 | 5/1996 | Maier-Laxhuber et al. | 165/104.12 |

FOREIGN PATENT DOCUMENTS

| | | | |
|---|---|---|---|
| 0 695 920 | 2/1996 | European Pat. Off. | F25B 35/04 |
| 982202 | 6/1951 | France | 15/4 |
| 398467 | 2/1932 | United Kingdom . | |
| 476676 | 5/1937 | United Kingdom . | |
| 549730 | 12/1942 | United Kingdom . | |
| 96/11368 | 4/1996 | WIPO | F25B 35/04 |

*Primary Examiner*—William Doerrler
*Attorney, Agent, or Firm*—Bacon & Thomas, PLLC

[57] ABSTRACT

Method of managing a solid/gas adsorption or thermochemical reaction, the site of which is a device comprising a reactor, which contains a solid capable of reacting with a gas, an evaporator/condenser assembly for the gas and means intended to reheat the solid, the method comprising the steps which consist in:

bringing the evaporator/condenser assembly, when the latter is filled with liquid, into communication with the reactor so as to cool the evaporator, switching on the means intended to reheat the solid, so as to deliver the gas to the evaporator/condenser assembly.

According to the invention, the step of switching on the means intended to reheat the solid starts before the previous step has finished.

5 Claims, 6 Drawing Sheets

METHOD OF MANAGING A SOLID/GAS ADSORPTION OR THERMOCHEMICAL REACTION

BACKGROUND OF THE INVENTION

1. Field of the Invention

The present invention relates to a method of managing a solid/gas adsorption or thermochemical reaction allowing the production of cold and/or heat by a solid/gas reaction.

2. Description of Related Art

The thermochemical reaction, or adsorption, is based on a reversible reaction between a solid and a gas of the type:

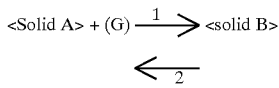

The reaction is exothermic in direction 1, which means that in this direction it produces heat, and it is endothermic in direction 2; In direction 1, it produces cold by evaporating the gas (G); in direction 2, it may also produce cold if it is carried out in a closed vessel.

Such a system enables energy to be stored in chemical form and has various fields of application.

In addition, such a system makes it possible, using a heat source at a temperature Ts, to produce heat at a temperature Tu such that:

$$Tu<Ts$$

In this case, the system is called a "chemical heat pump".

Such a system also makes it possible, using a heat source at a temperature T's, to produce heat at a temperature T'u such that:

$$T'u>T's$$

In this case, the system is called a "chemical thermoconverter".

By virtue of this system, it is possible to produce refrigerating power using a heat source and simultaneously to produce, using a heat source at a temperature T"s, heat at a temperature T"u (T"u<T"s) and refrigerating power.

Depending on the circumstances, the use of the heat or cold produced is simultaneous with the consumption of energy at high temperature (Ts, T's, T"s) or at a later time (storage effect).

Document EP-A-0,382,586 discloses a device for the production of cold and/or heat by a solid/gas reaction, comprising two reactors, forming a reaction chamber, each containing a salt capable of reacting chemically with a gas, a condenser and an evaporator for the gas. The elements of the device are arranged so as to allow the gas to follow a path from one reactor to the other, passing through the condenser and the evaporator. At the end of the chemical reaction, the reactor lean in gas is at a temperature higher than that of the reactor containing the gas which is to react with the salt, the two reactors being at different pressure levels. Heat is sent via a heat-transfer-fluid system from the reactor which is at the higher temperature to the reactor which is at the lower temperature so as to increase the temperature of the latter. The chemical reaction has then taken place in the reverse direction, part of the heat of one reactor serving as a source of heat for desorption of the gas in the other reactor. This transfer of heat between the two reactors serves to improve the efficiency of the system.

In some applications, for example the production of ice, a simpler device may be suitable. Thus, a simplified device may comprise a single reactor, provided with a heat exchanger enabling the solid to be regenerated, it being possible for this reactor to be connected selectively to an evaporator/condenser assembly placed in a water reservoir. Evaporation of the liquid, when the gas reacts with the salt or is adsorbed on the solid in the reactor, causes the formation of ice. When the salt in the reactor is in the synthesis phase, or when the adsorbent is enriched with gas, that is to say reacts exothermically, the heat produced is removed via the heat exchanger. Regeneration of the solid, by heating, at the end of the decomposition or desorption reaction, leads to the evaporator/condenser assembly being reheated by condensation of the gas, this having the result of detaching the ice formed on the outside of the evaporator.

However, the means making it possible to remove the heat of reaction of the salt, or the heat of adsorption of the gas on the adsorbent solid, placed in the reactor, have the drawback of making the device bulky. In addition, the complete cycle, of ice production and salt regeneration, may prove to be very long.

SUMMARY OF THE INVENTION

The subject of the present invention is therefore a method of managing a solid/gas adsorption or thermochemical reaction, which makes it possible to reduce the duration of its operating cycle and reduce the energy necessary for regenerating the system, and which also makes it possible to reduce the size of the device, the site of the reaction.

In order to achieve this objective, the invention provides a method of managing a solid/gas adsorption or thermochemical reaction, the site of which is a device comprising a reactor, which contains a solid capable of reacting with or of adsorbing a gas, an evaporator/condenser assembly for the gas and means intended to reheat the solid, the method comprising the steps which consist in:

bringing the evaporator/condenser assembly, when the latter is filled with liquid, into communication with the reactor so as to cool the evaporator, switching on the means intended to reheat the solid, so as to deliver the gas to the evaporator/condenser assembly, and being characterized in that the step of switching on the means intended to reheat the solid starts before the previous step has finished.

Preferably, this method includes a prior step consisting in equipping the reactor, with its contents, so that it has a thermal mass sufficient to absorb the heat produced during the exothermic reaction.

According to one embodiment of the invention, the prior step consists in equipping the reactor, with its contents, so that the product of its thermal mass multiplied by its specific heat and by a fixed temperature gradient is greater than the heat released during the reaction between the salt and the gas.

According to another embodiment, the prior step consists in placing around the reactor a jacket designed to contain a liquid intended to evaporate during the synthesis phase of the reaction.

According to another embodiment, the prior step consists in placing, in thermal contact with the solid, a material that undergoes a phase change.

Other features and advantages of the present invention will appear more clearly on reading the following description, given with reference to the appended drawings in which:

BRIEF DESCRIPTION OF THE FIGURES OF DRAWINGS

FIG. 1 is a diagrammatic view of a conventional device for producing cold;

FIGS. 2 to 6 each represent a Clapeyron diagram illustrating the operating phases of the device in FIG. 1;

FIG. 7 is a diagrammatic view of a device for producing cold, allowing implementation of the method of the invention;

FIGS. 8 to 10 each represent a Clapeyron diagram illustrating the phases of a chemical reaction used in the device in FIG. 7; and FIGS. 11 to 13 each represent a Clapeyron diagram illustrating the phases of an adsorption used in the device in FIG. 7.

DETAILED DESCRIPTION OF THE PREFERRED EMBODIMENT

Figure 1:
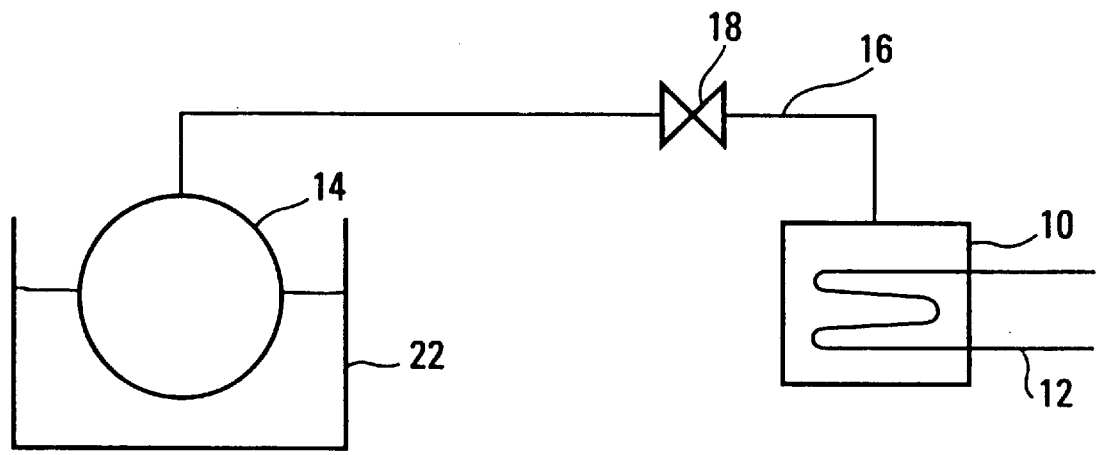

FIG. 1 shows a conventional device for producing cold which, in the example illustrated, is intended to produce ice. This device comprises a reaction chamber, called reactor 1, containing an active solid, for example a salt, intended to react reversibly with a gas. The reactor 10 is provided with a heat exchanger 12, for example a tube exchanger connected to a heat-transfer-fluid circuit (not shown). The reactor 10 is connected to an evaporator 14 via a pipe 16 provided with a valve 18. The evaporator 14 is placed in a container 22 which contains water to be converted into ice.

The operation of this conventionally constructed device will now be described with reference to the Clapeyron diagrams in FIGS. 2 to 6.

The operating cycle will be described starting from the storage phase, which phase is shown in FIG. 2, FIGS. 2 to 6 representing here a system involving a solid/gas chemical reaction. During this phase, the evaporator 14, which is filled with liquid ammonia, and the reactor 10 are at ambient temperature. The valve 18 is closed, the reactor 10 being at low pressure while the evaporator is at high pressure.

Figure 3:
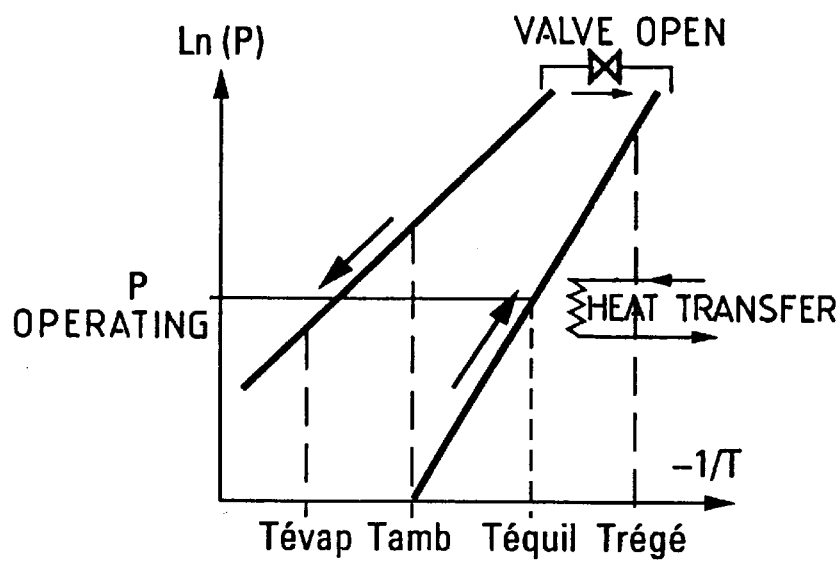

During the production phase, shown in the diagram in FIG. 3, the valve 18 is open, bringing the reactor 10 into communication with the evaporator 14. The liquid ammonia evaporates and reacts with the salt contained in the reactor 10, thus causing a drop in temperature of the evaporator 14. The heat exchanger 12 enables at least some of the heat produced during the exothermic reaction between the salt and the gas to be removed, making it possible to maintain the salt in the synthesis conditions. Production of cold at the evaporator 14, which is immersed in water, leads to the formation of ice on the outer surface of the evaporator.

Figure 4:
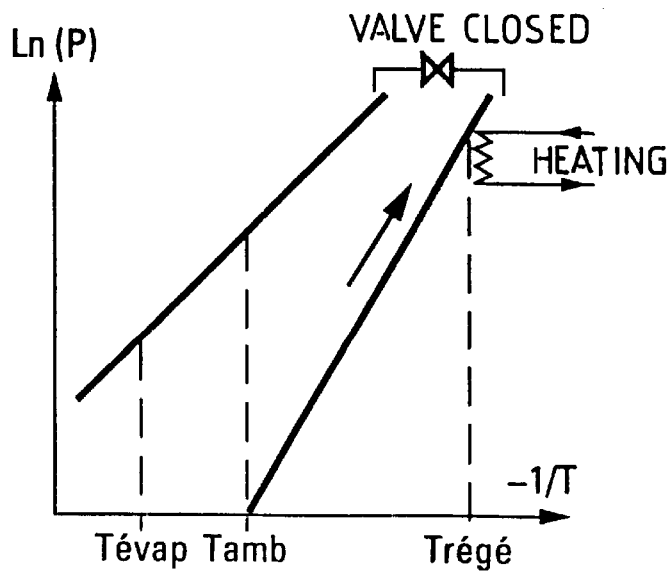

Next, the device passes into a transient phase, shown in FIG. 4. This phase enables the device to be regenerated by delivering gas from the reactor 10 to the evaporator 14. During this phase, the salt is heated by means of the heat exchanger 12 to its regeneration temperature.

Figure 5:
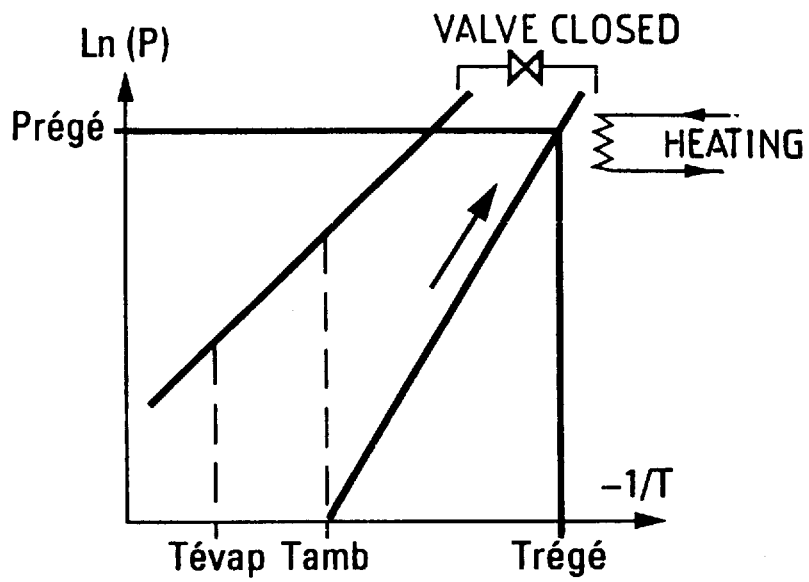

The rest of this transient phase is shown in the diagram in FIG. 5, in which the salt tends to be under the regeneration pressure and temperature conditions. The valve 18 is kept closed throughout the duration of the transient phase.

Figure 6:
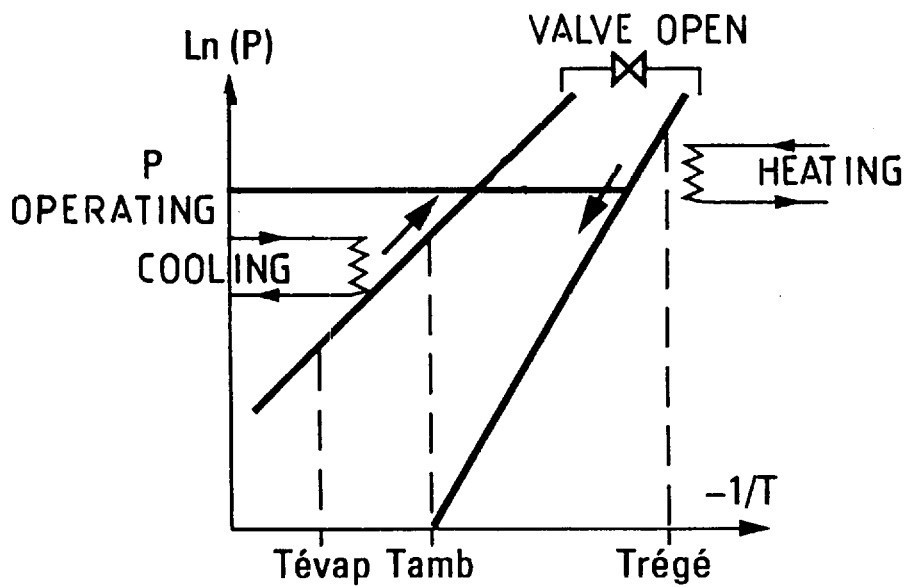

The final phase of the operating cycle is shown in FIG. 6 and concerns the decomposition of the salt. During this phase, the valve 18 is open, allowing the gas to pass from the reactor 10 to the evaporator 14. The evaporator, on receiving the gas coming from the reactor, acts as a condenser for the gas. The heat released at the condenser, during condensation of the gas, increases the temperature of the outside of the condenser, this having the result of detaching the ice. When regeneration is completed, the valve 18 is closed again and the device is thus under the initial conditions of the storage phase at the start of the operating cycle.

This type of device has two major drawbacks. Firstly, it requires the presence of a powerful heat exchanger and, in addition, the duration of the operating cycle may prove to be lengthy. However, when the device is intended to produce ice for domestic use, it is desirable to have rapid production.

Figure 7:
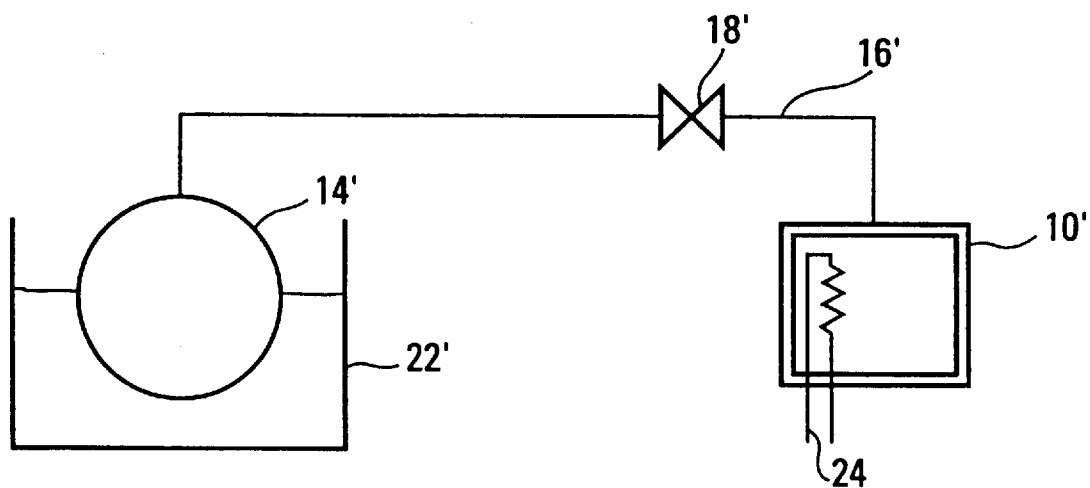
Figure 2:
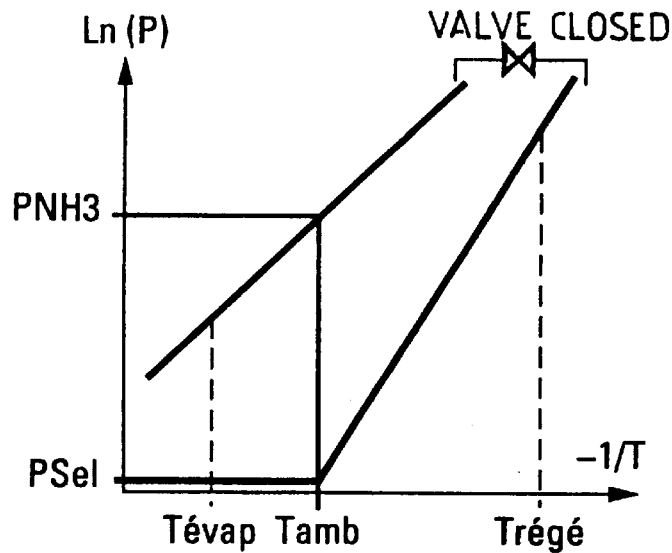

FIG. 7 shows a device shows a device for producing cold which allows implementation of the method of managing a solid/gas adsorption or thermochemical reaction according to the invention. In a preferred example, this device is intended to produce ice. The device in FIG. 7 is comparable to that in FIG. 1 in that it comprises a reactor 10', a condenser-evaporator 14' and a gas transfer pipe 16' provided with a valve 18'. On the other hand, the device in FIG. 7 differs from that in FIG. 1 in that it does not include a heat exchanger 12, which had the function of removing the heat produced during the exothermic reaction between the salt and the gas.

In order to compensate for this lack of exchanger 12, one of the steps in the method according to the invention consists in equipping the reactor 10' so that it has a thermal mass sufficient to absorb the heat produced during the exothermic reaction. More precisely, the reactor, with its contents, is designed so that the product of its thermal mass multiplied by its specific heat and by a temperature range $\Delta T=(T_{equi}-T_{amb})$ is greater than the heat of the reaction. This is represented by the following formula:

$$\Delta H_r < M\, c_p\, \Delta T$$

Nevertheless, the reactor 10' is provided with an electrical resistance element 24 enabling the salt to be regenerated.

Figure 8:
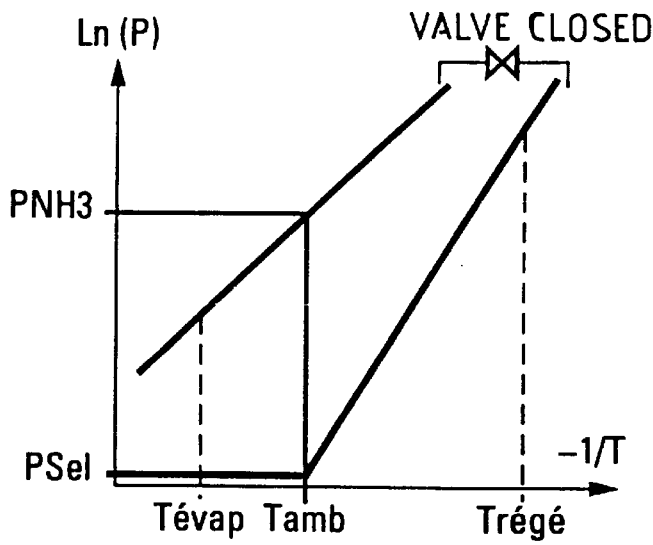

Another aspect of the method of managing a thermochemical reaction according to the invention will now be described with reference to the Clapeyron diagrams in FIGS. 8 to 10.

As in the previous example, the operating cycle of the device will be described starting from the storage phase, the phase shown in FIG. 8. During this phase, the evaporator 14, which is filled with liquid ammonia, and the reactor 10' are at ambient temperature. The valve 18' is closed, the reactor 10' being at low pressure while the evaporator is at a higher pressure.

Figure 9:
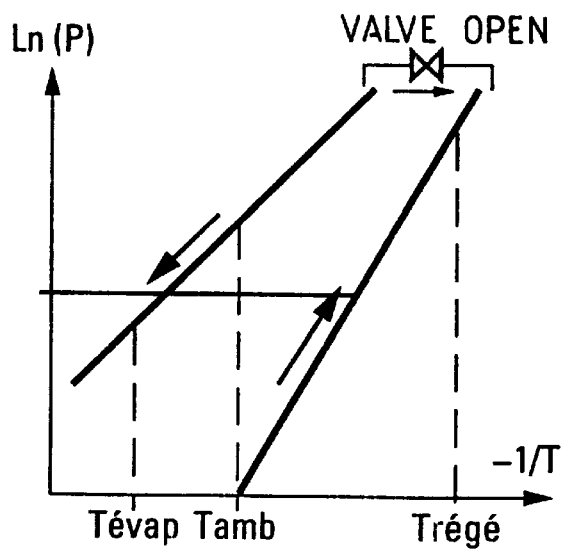

During the production phase shown in the diagram in FIG. 9, the valve 18' is open, which brings the reactor 10' into communication with the evaporator 14'. The pressure in the device in FIG. 1 then stabilizes. Evaporation of the ammonia produces cold while the salt is in the synthesis phase, the heat of the exothermic reaction not being removed. The thermal mass of the reactor, with its contents, is equivalent to a thermal capacitor which absorbs the energy of the reaction, thus enabling the salt to be maintained in the synthesis condition for the necessary time.

Figure 10:
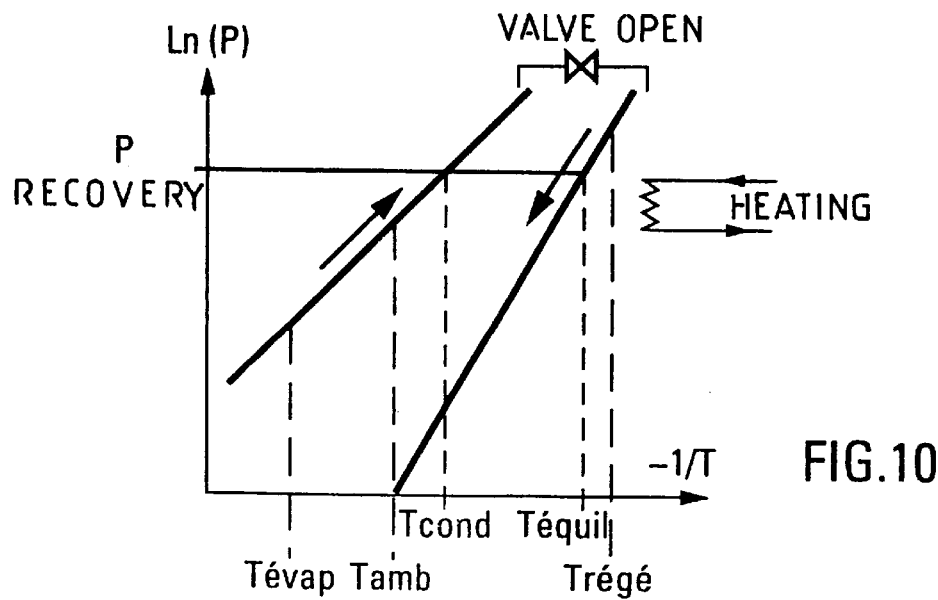

Next, and according to another step in the method of the invention shown in FIG. 10, the electrical resistance element is switched on before the salt has completed its synthesis reaction, the valve 18' remaining open. When using conventional devices, such as the one in FIG. 1, the salt would only be heated after the synthesis reaction had been completed.

According to the invention, the transient phase described with reference to FIGS. 4 and 5 is eliminated. Some of the energy released during the synthesis of the salt is used to preheat the salt. The regeneration phase then starts, since the condenser formed by the evaporator 14' is at a low temperature. The salt reaches its regeneration temperature more rapidly by virtue of the heat of the synthesis reaction stored in the thermal capacitor formed by the mass of the reactant and of the reactor.

The supply of thermal energy in the form of the Joule effect from the electrical resistance element is stopped before complete regeneration of the reactant: the inertia of the hot reactor, in the course of cooling down, enables the desorption to continue as long as the deviation from equilibrium, $T_{regen} - T_{eq.decomp}$ (FIG. 10), is >0.

Figure 11:
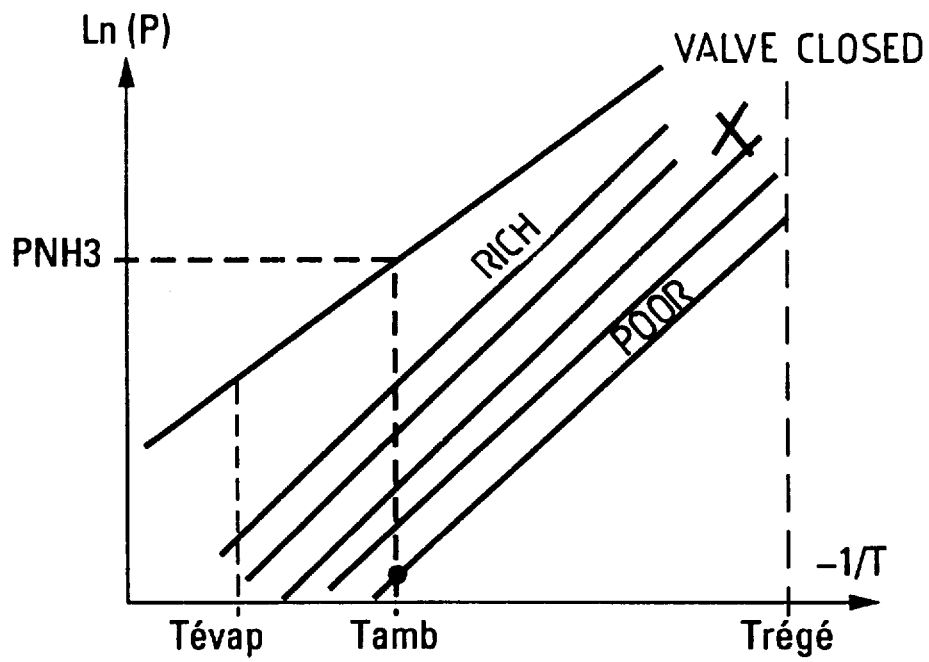
Figure 12:
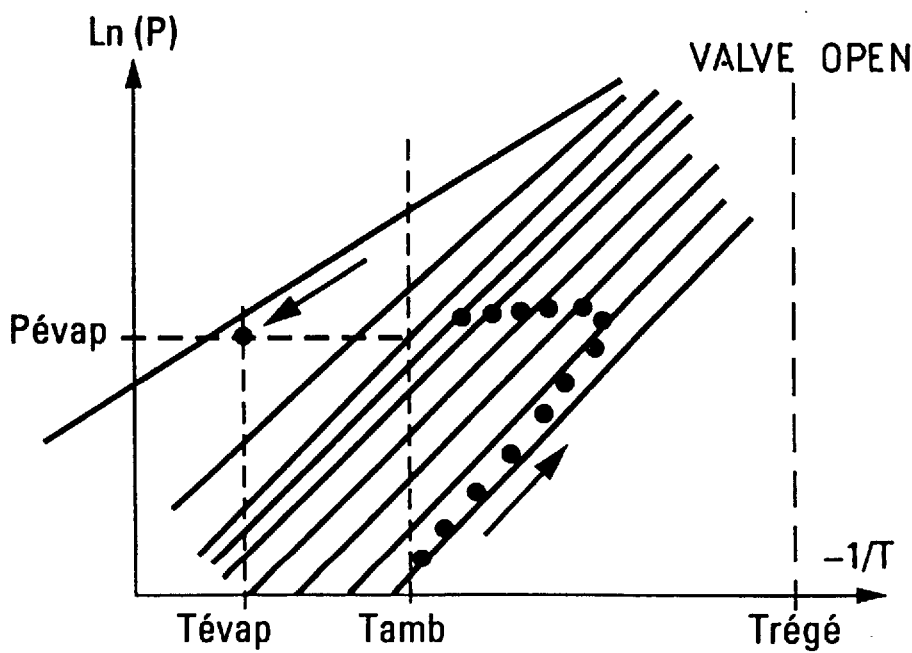
Figure 13:
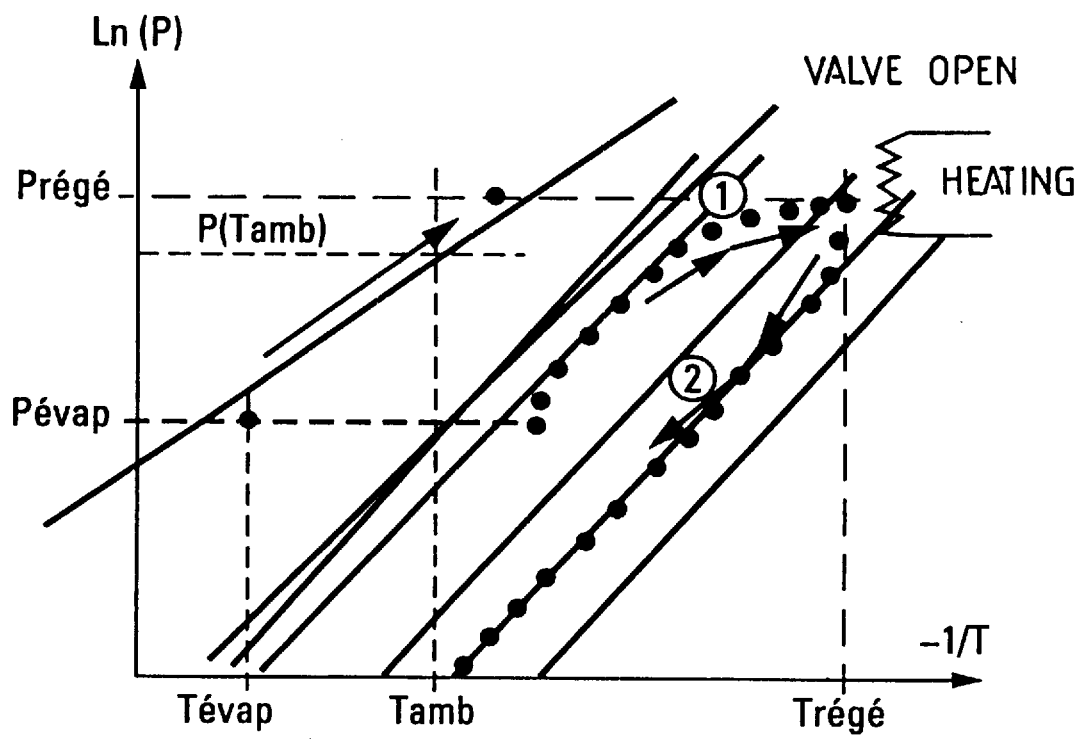

Shown in FIGS. 11 to 13 is the operating cycle of a device for producing cold, similar to that described with reference to FIGS. 7 to 10 but employing a method of managing a solid/gas adsorption according to the invention. The Clapeyron diagrams in FIGS. 11 to 13 consist of isotheres of the adsorbent solid when it passes from a state rich in adsorbed gas to a state lean in gas.

As in the previous example, the operating cycle of the device will be described starting from the storage phase, the phase shown in FIG. 11. During this phase, the evaporator 14, which is filled with liquefied gas, and the reactor 10' are at ambient temperature. The valve 18' is closed, the reactor 10' being at low pressure while the evaporator is at a higher pressure.

During the production phase shown in the diagram in FIG. 12, the valve 18' is open, which brings the reactor 10' into communication with the evaporator 14'. The pressure in the device in FIG. 1 then stabilizes. Evaporation of the liquefied gas produces cold while the adsorbent is in the synthesis phase, the heat of the exothermic adsorption not being removed. The thermal mass of the reactor, with its contents, is equivalent to a thermal capacitor which absorbs the energy of the adsorption, thus enabling the adsorbent to be maintained in the synthesis condition for the necessary time.

Next, and according to another step of the method of the invention shown in the diagram in FIG. 13, the electrical resistance element is switched on before the adsorbent has completed its adsorption, the valve 18' remaining open.

Described in the first example referred to is a reactor provided with a water exchanger open to the outside, which water evaporates during the synthesis phase. Thus, in the case of regeneration (by a different exchanger, here an electrically operating valve), the thermal mass is reduced.

A device intended to produce ice comprises a reactor 10' formed by a shell surrounded by a jacket filled with a volume of water which evaporates during the synthesis phase of the reaction. A stainless steel evaporator/condenser 14' having a mass of 210 g and provided with copper fins having a mass of 60 g contains 43 g of liquid ammonia. The device is intended to cool water from 20° C. to −35° C. in order to produce either three lumps of ice each of 20 g or, preferably, three times 20 g of ice.

The reactor 10' has an internal volume of 0.55 l containing 185 g of binder consisting of compressed expanded graphite in which 130 g of $NiCl_2$ are dispersed. The operational advance is $\Delta x=0.6$. The mass of the reactor, which is made of stainless steel, is 250 g. An electrical resistance element having a mass of 100 g is placed inside the reactor. The jacket of the reactor contains 48 g of water.

The heat capacity of the reactor/reactant assembly is 291 $J.K^{-1}$. The exchanger jacket containing 48 g of water raised from 30° C. to 100° C. consumes 14 kJ, the evaporation of this water consuming 108 kJ. The 2 to 6 $NH_3$ $NiCl_2$ synthesis reaction enthalpy being 59 kJ per mole of ammonia for 130 g of $NiCl_2$ with $\Delta X=0.6$, the heat dissipated is 141 kJ. The reaction is therefore terminated after this evaporation of the 48 g of water at ambient pressure, the 141 kJ being dissipated in the reactor/reactant assembly consuming 20 kJ (=291×70) where 70=$\Delta T$ from 30° to 100° C., and 122 kJ in the exchanger jacket.

After the production phase has been initiated, the electrical resistance element is turned on after 42 seconds in order to allow complete regeneration after 3 minutes and 10 seconds.

Alternatively, instead of providing a jacket suitable for containing water intended to evaporate during the synthesis phase of the reaction, the reactor may be designed so that it has a mass sufficient to absorb the heat produced during the exothermic reaction.

In an installation similar to the previous one, as the temperature of the reactant will rise from 30° C. to 100° C., $\Delta T=70°$ C., 141 kJ are to be dissipated. The reactor, which is the same as in the previous example, has a $C_p$ of 116 $JK^{-1}$. Therefore 116×70=8120 J are to be absorbed. The mass of the reactor, which is made of stainless steel having a $c_p=0.5$ J/gK, must be 3.8 kg.

According to another embodiment, instead of providing a jacket suitable for containing water, it is possible to use capsules or nodules containing a material that undergoes a change of phase, of high capacity, in thermal contact with the reactant solid. For example, capsules or nodules containing naphthalene melting at 78° C. and consuming 149 J/g in thermal contact with the reactant solid are used.

The management method according to the invention has many advantages. Firstly, the valve 18' is actuated only twice in the cycle, once for opening it and once for closing it, while the valve 18 in the conventional device was actuated on four occasions. In addition, the duration of an operating cycle is reduced, in some cases by up to a half. This arises from the reduction in the transient phases resulting from designing the reactor so that it forms a thermal capacitor.

Finally, the energy necessary for regeneration is less than that used in the conventional device since some of this energy is supplied by that stored in the thermal capacitor.

The method according to the invention makes it possible, for example, to produce ice or to cool a fluid.

We claim:

1. Method of managing a solid/gas adsorption or thermochemical reaction in a device comprising a reactor, which contains a solid capable of reacting with or adsorbing a gas, an evaporator/condenser assembly for the gas and means for reheating the solid, the method comprising the steps of:

bringing the evaporator/condenser assembly, when the latter is filled with liquid, into communication with the reactor so as to cool the evaporator, activating the means for reheating the solid, so as to deliver the gas to the evaporator/condenser assembly, wherein the step of activating the means for reheating the solid starts before the previous step has finished while the evaporator/condenser assembly is still in communication with the reactor.

2. Method according to claim 1, further comprising a prior step of equipping the reactor with a thermal mass sufficient to absorb the heat produced during the exothermic reaction.

3. Method according to claim 2, wherein the prior step comprises equipping the reactor so that the product of the thermal mass of the reactor multiplied by its specific heat and by a fixed temperature gradient is greater than the heat released during the reaction between the salt and the gas.

4. Method according to claim 2, wherein the prior step comprises placing around the reactor a jacket containing a liquid which evaporates during the synthesis phase of the reaction.

5. Method according to claim 2, wherein the prior step comprises placing a material that undergoes a phase change in thermal contact with the solid.

* * * * *